(No Model.) 2 Sheets—Sheet 1.
S. W. ROBINSON.
GAGE FOR MEASURING THE VELOCITY OF FLUIDS.
No. 481,310. Patented Aug. 23, 1892.
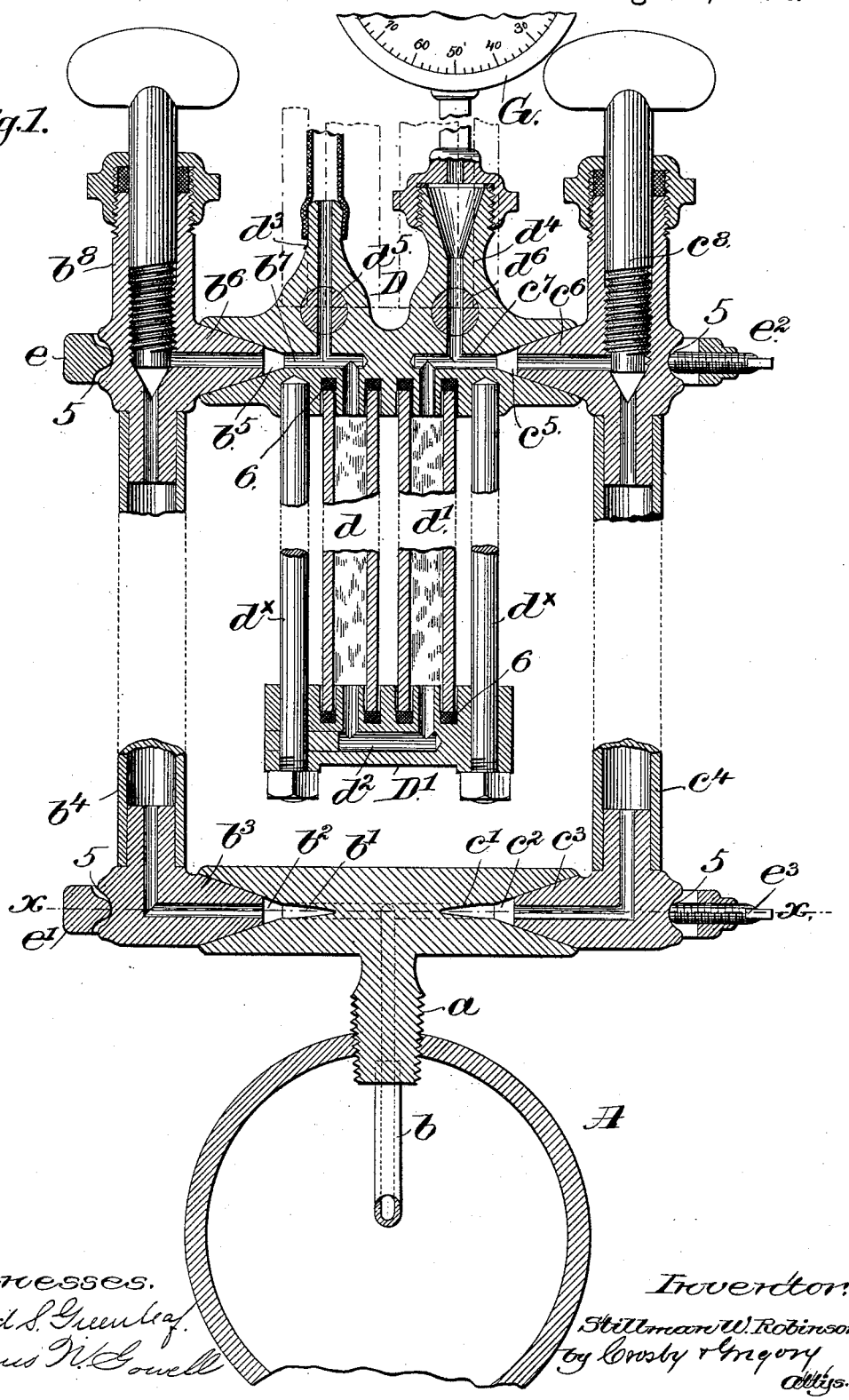

(No Model.) 2 Sheets—Sheet 2.
S. W. ROBINSON.
GAGE FOR MEASURING THE VELOCITY OF FLUIDS.
No. 481,310. Patented Aug. 23, 1892.
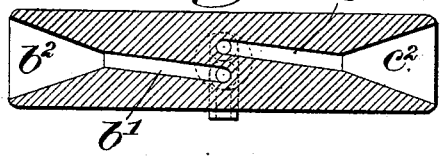
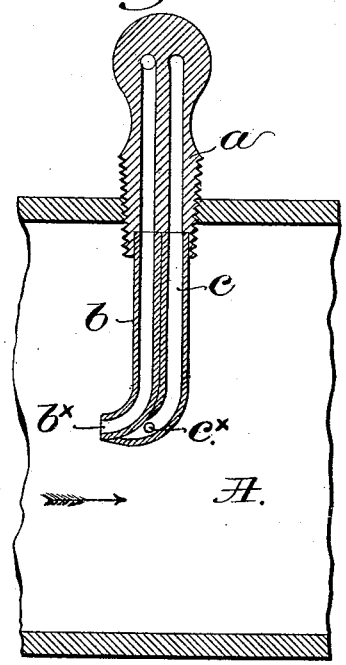
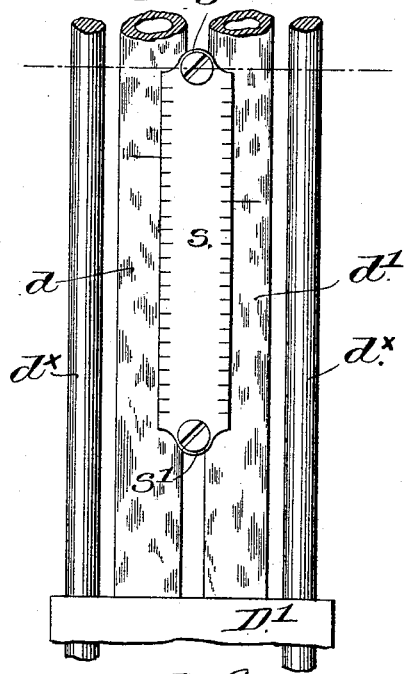
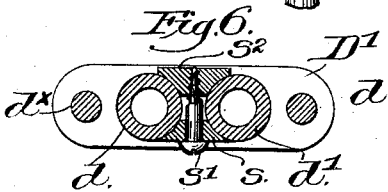
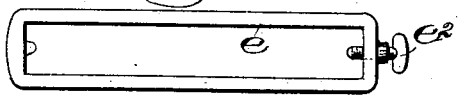
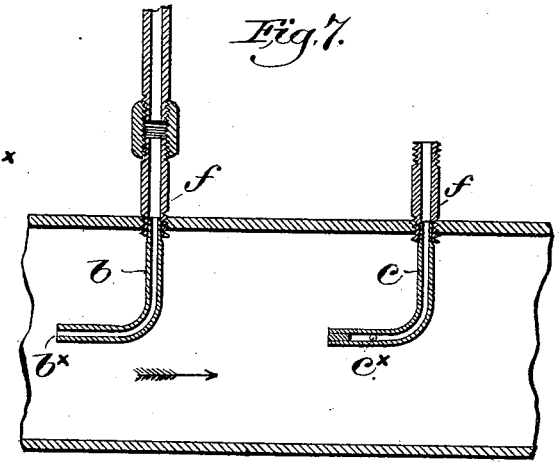
Witnesses.
Fred S. Greenleaf.
Louis N. Gowell.
Inventor.
Stillman W. Robinson.
By Crosby & Gregory
attys.

UNITED STATES PATENT OFFICE.

STILLMAN W. ROBINSON, OF COLUMBUS, OHIO.

GAGE FOR MEASURING THE VELOCITY OF FLUIDS.

SPECIFICATION forming part of Letters Patent No. 481,310, dated August 23, 1892.

Application filed September 15, 1891. Serial No. 405,762. (No model.)

*To all whom it may concern:*

Be it known that I, STILLMAN W. ROBINSON, of Columbus, county of Franklin, State of Ohio, have invented an Improvement in Gages for Measuring the Velocity of Fluids, of which the following description, in connection with the accompanying drawings, is a specification, like letters and figures on the drawings representing like parts.

This invention relates to that class of devices for measuring the velocity of fluids, commonly known as the "Pitot tube" class, wherein a bent tube is inserted in the moving liquid, with its open mouth or end directed toward the current, the impact of the moving fluid against the open end of the tube causing an increase of pressure in the tube above its normal or static pressure.

This invention comprehends a measuring device in which two tubes are employed—one a Pitot tube, which presents an open mouth to the current and the other a static tube having a closed end with a transverse opening at a short distance from the end, an indicating device being connected with the said tubes.

This invention also comprehends a device wherein the indicating-tubes are made movable, to thus adapt them for use in measuring the velocity of gases, as well as of liquids, and for use in connection with a conduit or pipe in whatever position the latter may be placed.

One part of this invention therefore consists in a measuring device containing a Pitot tube presenting an open mouth toward the current, a static tube having a closed end and provided with a transverse opening therethrough, and an indicating device connected with said tubes, substantially as will be described.

Other features of this invention will be hereinafter described, and pointed out in the claims at the end of this specification.

Figure 1 represents in vertical section a measuring device embodying this invention; Fig. 2, a sectional detail showing the arrangement of the tubes within the conduit; Fig. 3, a sectional detail taken on the dotted line $x$ $x$, Fig. 1. Fig. 4 shows one of the clamping-straps by itself; Figs. 5 and 6, details showing the manner of attaching the indicating-plate; and Fig. 7 shows a modified construction to be described.

Referring to the drawings, A represents any closed conduit or pipe containing a moving fluid, the direction of flow being indicated by arrows. A plug $a$, preferably tapped into the conduit or pipe A, carries the Pitot tube $b$, suitably shaped or bent, as represented, to present its open end or mouth $b^\times$ toward the current or flow of fluid in the conduit. The plug $a$ will also preferably carry a second static tube $c$, which, as herein represented, follows the tube $b$ closely, and has its end closed and brazed or otherwise secured to the bent end of the tube $b$, the said tube $c$, however, having two lateral openings $c^\times$ near its end, which constitute a transverse opening extending completely through the tube, to be referred to. It is important that the openings $c^\times$ form an opening or hole extending entirely through the tube $c$ from side to side and that the lateral surfaces of the tube $c$ at its opposite points $c^\times$ be parallel. It is also important that the end of the static tube be closed in order that the static pressure may be accurately indicated. When the static tube is thus constructed, it is found that an appreciable deviation of the end of the tube from correct alignment affects the static pressure inconsiderably, which would not be the case if the static tube had only a single aperture at one side or on the bottom, for with a single aperture any deviation of the tube from correct alignment, and also the presence of any counter or cross current within the conduit, materially affects the accuracy of the indication of the static pressure.

The plug $a$, as herein represented, has a T-shaped head provided at its opposite ends with the conical or flaring mouths $b^2$ $c^2$, which communicate by means of the passages $b'$ $c'$ with the tubes $b$ and $c$. (See Figs. 1 to 3.) The flaring mouths $b^2$ $c^2$ referred to are fitted to receive the conical fittings $b^3$ $c^3$, standing out at right angles from the lower ends of the supporting-tubes $b^4$ $c^4$, connected at the opposite ends with an indicating device to indicate the pressure created by the impact, said indicating device in this present construction consisting of the head D, having at its opposite ends the flaring mouths $b^5$ $c^5$ to receive the conical fittings $b^6$ $c^6$ on the upper ends of the supporting-tubes $b^4$ $c^4$. The flaring mouths $b^6$ $c^6$ in the head D communicate by means of passages $b^7$ $c^7$ with the preferably glass indicating-tubes $d$ $d'$, held firmly between said head and the end piece D' by means of bolts $d^\times$, the ends of the tubes $d$ $d'$ being seated upon rubber or other suitable packing 6, countersunk in the said head and end piece to preserve a tight joint, the outer ends of said tubes being connected by a passage $d^2$ in the end piece D', as shown in Fig. 1. The tubes $b^4$ $c^4$ are provided with suitable seats 5 to receive the straps $e$ $e'$, fitted with clamping-screws $e^2$ $e^3$, by means of which the fittings on the tubes $b^4$ $c^4$ referred to may be drawn into the head of the plug $a$ and the head D, as represented in Fig. 1, to form perfectly-tight joints. The head D is fitted with two nozzles $d^3$ $d^4$, communicating, respectively, with the passages $b^7$ $c^7$ in the head, said nozzles being controlled by suitable valves $d^5$ $d^6$, one of the nozzles, as $d^4$, being threaded for the attachment of a pressure-gage G, if desired. The tubes $b^4$ $c^4$ are provided with suitable valves $b^8$ $c^8$, by which communication through the supporting-tubes may be controlled at will.

The operation of the device is as follows: Assuming the conduit A to contain gas flowing in the direction indicated by the arrows and that it is desired to secure the exact velocity of the gas in the conduit. The valves $b^8$ $c^8$ being closed, the valves $d^5$ $d^6$ will be opened and a quantity of liquid will be poured into the tubes $d$ $d'$ through the flaring mouth of the nozzle $d^4$, the liquid rising to the same height in each of the tubes. The valves $d^5$ $d^6$ will now be closed and the valves $b^8$ $c^8$ opened, when the moving gas in the conduit will drive with impact into the open mouth $b^\times$ of the tube $b$, and, being brought to rest, will create a pressure in the tube $b$ in addition to or in excess of the static pressure of the gas in the conduit, and as the pressure in the tube $c$, communicated thereto through the side openings $c^\times$ in the end of the tube, previously referred to, is the static pressure of the flowing gas only it follows that there will be an excess of pressure in the tube $b$ over that in the tube $c$, due to the impact of the moving fluid as it enters the mouth of the tube $b$, which will act to depress the column of liquid standing in the glass tube $d$ and raise the column in the tube $d'$, the difference in height of the two columns of liquid as they stand in the tubes serving to determine the velocity of the fluid in the conduit. The greater the velocity of the fluid in the conduit the greater the excess of pressure in the tube $b$, due to the impact, and the greater the difference of level between the two columns of liquid in the indicating-tubes. To facilitate the reading of the difference of level of the two columns of liquid in the indicating-tubes and to assist in calculating the velocity of the fluid in the conduit, a graduated scale $s$ is clamped upon the tubes $d$ and $d'$ by clamping-screws $s'$ and plate $s^2$. (See Fig. 5.) If water, oil, or other liquid is flowing in the conduit A and it is desired to measure the velocity of the flow with the device in the position indicated in full lines, it will be necessary to introduce mercury into the tubes $d$ $d'$, or in place of mercury any other heavy liquid which will not mix with that flowing in the conduit and which rises and fills the indicating device, the pressure of the liquid in the tube $d$ maintaining the two columns at different levels to thus furnish means by which to determine the velocity of the liquid in the conduit; but when measuring the velocity of flow of the liquid in the pipe the device will be ordinarily set up, with the supporting-tubes $b^4$ $c^4$ and the end piece D' in a position above the head D, as indicated by dotted lines, Fig. 1, a quantity of air being trapped in the upper end of the indicating-tubes and the end piece D', in which case the difference in level of the two liquid columns will serve for determining the velocity in the conduit. As the difference in level of the two columns of fluid in the indicating-tubes will vary according to the density as well as the velocity of the fluid in the conduit, a pressure-gage G is connected with the nozzle $d^4$ and the valve $d^6$ opened, when the gage will indicate the static pressure of the fluid in the conduit from which the density may be determined. The conical fitting at $b^6$ and $c^6$ will allow the supporting-tubes $b^4$ and $c^4$ to swing to any desired position to admit of the plug $a$ being placed on an inclined or vertical pipe. If the pressure of the fluid should not be sufficient to cause it to rise within the tubes $d$ $d'$, a tube or pipe may be applied to the nozzle $d^3$, the fluid drawn up thereby into the tubes, and the valve $d^5$ closed to thereby retain the fluid in the tubes to indicate the velocity, as described.

The construction of the device described is particularly suitable for a portable device; but if it is to remain permanently attached in the conduit the tubes $b$ $c$ need not necessarily be passed through the same plug, but may be provided with separate or independent plugs, as $f$ $f'$, Fig. 7, and, if desired, the tubes $b$ $c$, instead of being coupled or connected directly with the indicating device, may be connected through long pipes or tubes with the indicating device or tubes $d$ $d'$, located in some distant office.

This invention is not limited to the particular plug or to the particular construction shown, as the same may be varied without departing from the scope of this invention, the gist of this invention lying in the Pitot and static tubes $b$ and $c$, the Pitot tube having a mouth $b^\times$ at its extremity and the static tube having a closed end and a transverse opening through the parallel sides of the tube, since I have found by experiment that this form of terminal of the static tube is absolutely reliable for indicating static pressure as well as the open mouth $b^\times$ of the Pitot tube for impact pressure.

I am aware that the Pitot mouth or tube has been used on closed conduits in combination with a straight tube having an open end; but from my observations and experiments these combinations referred to are far less reliable than the one forming part of this invention, wherein the static tube has a closed end and a transverse opening extending entirely through the parallel sides of the tube.

I claim—

1. In a device for measuring the velocity of fluids, the combination of a Pitot tube presenting an open mouth to the current, a static tube having a closed end and diametrically-opposite openings in its parallel sides, and an indicating device connected upon said tubes, substantially as described.

2. In a device for measuring the velocity of fluids, the combination, with a Pitot tube presenting an open mouth to the current, a static tube having a closed end and provided with a lateral opening extending through its parallel sides, and an indicating device connected with said tubes, of a pressure-gage in connection with one of said tubes, to operate substantially as described.

3. In a device for measuring the velocity of fluids, a Pitot tube presenting an open mouth to the current, and a static tube having a closed end and its parallel sides provided with a transverse opening extending through the tube, combined with an indicating device connected with said tubes and made movable with relation thereto to permit the device to be used in connection with conduits standing in different angle and also to measure gases and liquids, all substantially as described.

4. In a device for measuring the velocity of fluids, a Pitot tube presenting an open mouth to the current, and a static tube having a closed end and provided with a transverse opening extending completely through the parallel sides of the tube, combined with two indicating-tubes in communication with each other at one of their ends and having their opposite ends connected, respectively, with said Pitot and static tubes, to operate substantially as described.

5. In a device for measuring the velocity of fluids, the combination, with a plug adapted to be screwed into a conduit, of a Pitot tube and a static tube carried by said plug, the static tube having a closed end and a transverse opening extending through its parallel sides, and an indicating device connected with said tubes and carried by said plug, substantially as described.

6. In a device for measuring the velocity of fluids, the combination, with a T-shaped threaded plug adapted to be screwed into a conduit and carrying Pitot and static tubes, of two tubes joined to the opposite ends of the T-head of said plug, said tubes having their free ends in communication with each other, to operate substantially as described.

7. In a device for measuring the velocity of fluids, a T-shaped threaded plug adapted to be screwed into a conduit, and Pitot and static tubes carried by said plug, combined with two supporting-tubes joined to the opposite ends of the T-head of said plug and two indicating-tubes joined to said supporting-tubes, whereby the said supporting and indicating tubes may be rotated with relation to the plug and to each other, to operate substantially as described.

8. The plug $a$ and the tubes $b$ and $c$, combined with the supporting-tubes $b^4 c^4$, jointed to said plug, and the head D, pivotally held between said supporting-tubes $b^4 c^4$, to operate substantially as described.

9. The plug $a$, having the flaring mouths $b^2 c^2$ and the tubes $b\ c$, connected therewith, combined with the supporting-tubes $b^4 c^4$, their conical-shaped fittings, the head D, indicating-tubes $d\ d'$, and end piece D', all to operate substantially as described.

10. The combination, with a conduit and a plug having a T-shaped head and carrying two tubes, one of which has its mouth turned toward the current in the conduit, of two supporting-tubes jointed to the opposite ends of said T-shaped heads and two indicating-tubes jointed to said supporting-tubes, and the straps $e\ e'$, to operate substantially as described.

11. The combination, with a conduit and a threaded plug having a T-shaped head and carrying two tubes, one of which has its mouth turned toward the current in the conduit, of two supporting-tubes jointed to the opposite ends of said T-shaped head, valves therefor, and two indicating-tubes carried by said supporting-tubes, substantially as described.

12. The plug $a$ and tubes $b$ and $c$, combined with the supporting-tubes $b^4 c^4$, jointed to said plug, valves therefor, the head D, indicating-tubes $d\ d'$, the nozzles $d^3\ d^4$, and valves therefor, to operate substantially as described.

13. The plug $a$ and tubes $b$ and $c$, combined with the supporting-tubes $b^4 c^4$, jointed to said plug, valves therefor, the head D, indicating-tubes $d\ d'$, the nozzles $d^3\ d^4$, valves therefor, and a pressure-gage connected with one of said nozzles, substantially as described.

14. In a device for measuring the velocity of fluids, the combination, with a Pitot tube and a static tube, the latter having a closed end and a transverse opening through its parallel sides, of indicating-tubes connected with said Pitot and static tubes and a graduated indicating-plate adjacent to said indicating-tubes, substantially as described.

15. The combination, with a conduit containing moving fluid, of two tubes inserted therein, one of which has its mouth turned toward the current, indicating-tubes connected with said tubes, the plate $s$, binding-screws $s'$, and plate $s^2$, substantially as described.

In testimony whereof I have signed my name to this specification in the presence of two subscribing witnesses.

STILLMAN W. ROBINSON.

Witnesses:
G. W. GREGORY,
FREDERICK L. EMERY.